United States Patent [19]

Gerber

[11] 4,216,355
[45] Aug. 5, 1980

[54] TELEPHONE LINE MONITORING APPARATUS

[75] Inventor: Hansueli Gerber, Bern, Switzerland

[73] Assignee: Chr. Gfeller A.G., Bern, Switzerland

[21] Appl. No.: 954,204

[22] Filed: Oct. 24, 1978

[30] Foreign Application Priority Data

Nov. 3, 1977 [CH] Switzerland .................. 13397/77

[51] Int. Cl.² ........................................... H04M 3/22
[52] U.S. Cl. .............................................. 179/18 AB
[58] Field of Search ...... 179/18 AB, 18 FA, 175.2 C, 179/1 MN, 18 FG

[56] References Cited

U.S. PATENT DOCUMENTS

| | | | |
|---|---|---|---|
| 3,821,486 | 6/1974 | Mussman | 179/18 FA |
| 3,996,426 | 12/1976 | Lancaster | 179/18 FA X |
| 4,027,235 | 5/1977 | MacRander et al. | 323/48 |
| 4,079,208 | 3/1978 | Rogers et al. | 179/18 FA |
| 4,118,597 | 10/1978 | Proctor et al. | 179/18 FA |

Primary Examiner—Thomas W. Brown
Attorney, Agent, or Firm—Birch, Stewart, Kolasch & Birch

[57] ABSTRACT

An apparatus is disclosed for monitoring the busy or free condition of telephone subscribers' lines, comprising a number of bridge circuits, each connected to one of the subscribers' lines. Each bridge circuit includes a discriminator which generates a signal when the associated line is busy. In order to achieve a substantial reduction of the transmission loss caused by the bridges, each bridge circuit includes not only a pair of terminals for supplying a voltage compensating the DC voltage on the subscribers' lines, but also a second pair of terminals for supplying a countervoltage to the bridge. The apparatus comprises a device for periodically generating the countervoltage and a device for periodically controlling the countervoltage generator. In order to make the apparatus less sensitive to inphase voltages occurring on the subscribers' lines, the discriminator is connected into the bridge circuit via a low-pass filter. The apparatus is particularly suited for use with lines connected to a line concentrator, in which case the central control unit of the line concentrator determines the monitoring interval.

5 Claims, 7 Drawing Figures

TELEPHONE LINE MONITORING APPARATUS

This invention relates to apparatus for monitoring the busy or free condition of telephone subscribers' lines, especially such as are connected to a line concentrator, and more particularly to apparatus of the type comprising a number of bridge circuits corresponding to the subscribers' lines, each bridge circuit being connected to one of the lines and including a discriminator for generating a signal when the associated line is busy and a pair of terminals for applying a voltage compensating the exchange line voltage applied to the associated line.

A simple bridge circuit for determining the loop condition of subscribers' lines is described in the journal *Der Ingenieur der Deutschen Bundespost*, No. 5, 1969, pages 196–202. This prior art bridge will be described in more detail below with reference to FIG. 1 of the accompanying drawings. It includes a discriminator and can be used to determine whether the loop resistance, which depends upon the busy or free condition of the telephone subscriber's line, is high or low. The bridge is proportioned in such a way that the unbalance voltage in the bridge arm to which the discriminator is connected is zero when the resistance between the A- and B-wires of the subscriber's line drops below a certain minimum. The discriminator detects this condition and reports "loop closed," which is synonymous with "line is busy." A so-called base voltage is used to supply the bridge, the voltage source for this base voltage being the exchange battery.

The stipulation that the unbalance voltage of the bridge is zero at the aforementioned predetermined minimum resistance of the loop, and the base voltage limited by the exchange battery, yield an optimum ratio of the values of the resistors in the arms of the bridge, the equivalent resistance with which the bridge loads the subscriber's line being on the order of one kilohm. The transmission loss of the subscriber's line is too greatly increased by this resistance. In order to offset this shortcoming, it has already been proposed to insert an inductance in series in each of the connections of the bridge to the A- and B-wires, respectively, which entails increased costs and takes up more space. The prior art bridge circuit lessens the influence of the in-phase voltages induced in the subscriber's line. However, it is desirable to eliminate the residual influence to a large extent as well. Moreover, if the values of the resistors in the bridge arms are not proportioned with extreme accuracy, an inadmissible disturbance of the performance of the discriminator may occur, caused by in-phase voltages on the A- and B-wires.

It is an object of this invention to provide improved apparatus of the type initially described which does not exhibit the aforementioned shortcomings and which is particularly suitable for monitoring the condition of subscriber's lines connected to a line concentrator.

To this end, in the monitoring apparatus according to the present invention, each bridge circuit comprises a second pair of terminals for applying a countervoltage oppositely directed to the compensating voltage, first means for periodically generating and applying the countervoltage to the second pair of terminals, and second means for controlling the first means.

A preferred embodiment of the invention will now be described in detail with reference to the accompanying drawings, in which.

Figure 1:
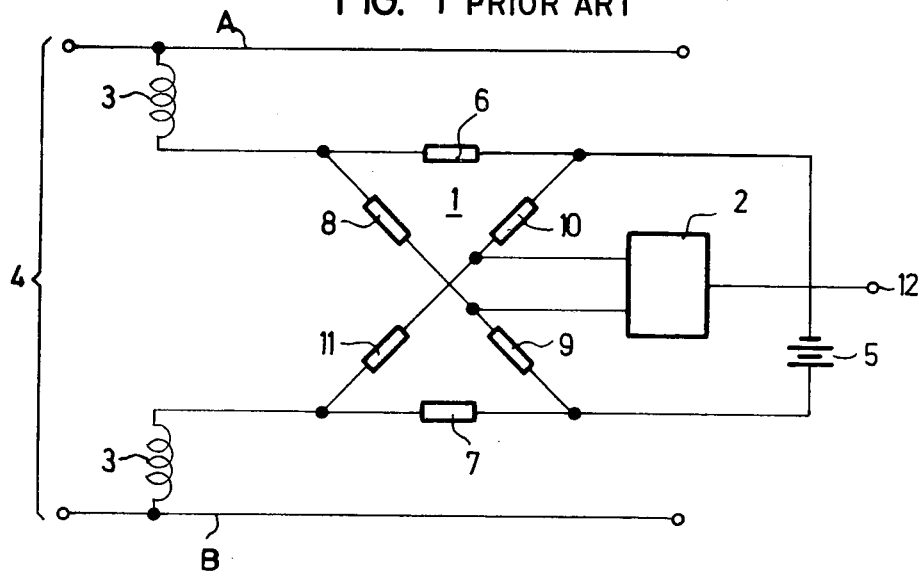
FIG. 1 is a diagram of the prior art bridge circit already mentioned.

FIG. 1 shows the earlier mentioned prior art bridge circuit 1 having a discriminator 2 connected to one of the arms thereof. The bridge 1 is connected via inductors 3 to the subscriber's line 4 to be monitored, having wires A and B. A voltage source 5 generates the so-called base current which counteracts the exchange battery (not shown). A series connection of resistors 6 and 7 and voltage source 5 forms a shunt of about 1 kilohm to the A- and B-wires of subscriber's line 4. This is the reason for the provision of inductors 3, so that the shunt becomes high impedance for alternating current. The values of resistors 8, 9, 10, and 11 in the bridge arms are such that when the resistance between the A- and B-wires of line 4 drops to a certain minimum, discriminator 2 responds and transmits a signal at its output 12 to indicate that the subscriber's line is busy.

The disadvantages of prior art bridge circuit 1 are the relatively high load placed on the subscriber's line by resistors 6 and 7 or the necessity of the relatively large and expensive inductors 3 and 4. Disturbances may arise, abetted by an in-phase voltage on the A- and B-wires, if the values of the resistors in the bridge circuit are not sufficiently tolerated.

Figure 2:
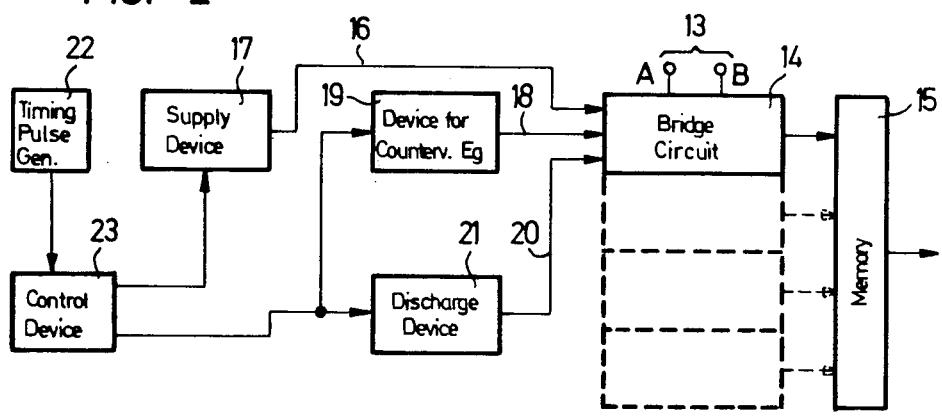
FIG. 2 is a block diagram of the apparatus according to the present invention.

FIG. 2 is a block diagram of an embodiment of the apparatus according to the invention for monitoring the busy or free condition of telephone subscribers' lines which are connected to a line concentrator. This apparatus comprises a number of bridge circuits corresponding to the number of subscribers' lines 13 to be monitored; however, for the sake of increased clarity, only one of these bridge circuits is actually illustrated, viz., bridge circuit 14 drawn in solid lines. Further identical bridge circuits are indicated in dashed lines. Each bridge monitors the operating condition of the associated subscriber's line of the line concentrator (not shown) and generates at its output a signal which is supplied to a memory 15. The information stored in memory 15 concerning the busy or free condition of the subscribers' lines is periodically read out and evaluated by a control device (not shown) of the line concentrator.

Bridge 14 is operated by means of a supply voltage fed to it over a two-wire line 16 from a supply device 17, a countervoltage generated by a device 19 and fed over a two-wire line 18, and a discharge voltage fed over a two-wire line 20 from a discharge device 21. Although FIG. 2 shows only bridge 14 as being connected to devices 17, 19, and 21, all the other bridge circuits shown only in dashed lines are simultaneously supplied with the same voltages.

A timing pulse generator 22, which is preferably that of the line concentrator, delivers timing pulses to a control device 23 which, in turn, transmits control signals for supply device 17, as well as for device 19, generating the countervoltage, and for discharge device 21.

Figure 3:
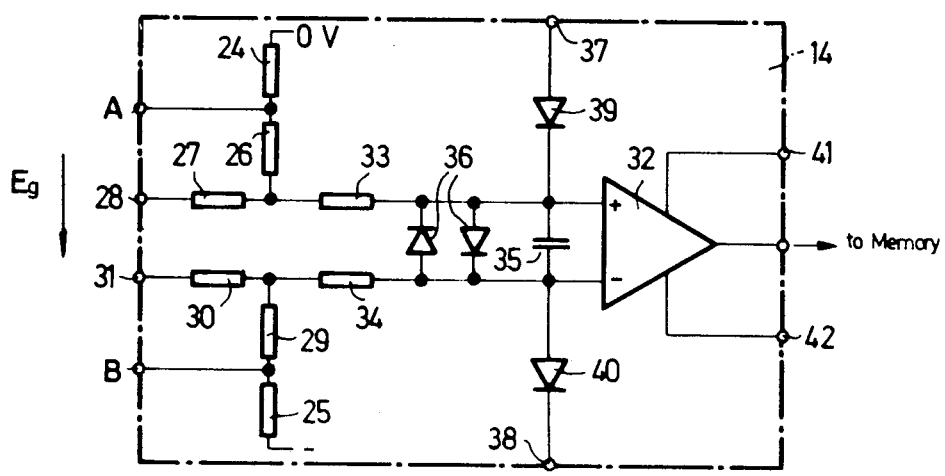
FIG. 3 is a circuit diagram of the bridge circuit of the apparatus of FIG. 2.

FIG. 3 is the circuit diagram of bridge 14, which is identical for all the bridge circuits of the apparatus. The subscriber's line is connected to the terminals designated as A and B, which are in turn connected via resistors 24 and 25, respectively (corresponding to resistors 6 and 7 of the prior art bridge shown in FIG. 1), to a voltage source, indicated by terminals OV and —, supplying a voltage compensating the exchange line voltage. Terminal A is also connected via a series connection of two resistors 26 and 27 to a terminal 28, and terminal B via a series connection of two resistors 29 and 30 to a terminal 31. Via terminals 28 and 31, the countervoltage $E_g$ generated by device 19 is supplied to bridge 14 over two-wire line 18, terminal 28 being negative with respect to terminal 31 when countervoltage $E_g$ is applied. Resistors 26, 27 and 29, 30 respectively correspond to resistors 8, 9 and 11, 10 of the prior art bridge shown in FIG. 1. However, the essential difference is that resistors 27 and 30 can be connected via terminals 28 and 31, respectively, to countervoltage $E_g$ and are not connected, like resistors 24 and 25, to the voltage source indicated by OV and —.

Owing to the introduction of countervoltage $E_g$, the values selected for resistors 24 and 25 can be substantially higher, e.g., 15 kilohms each, with the same mode of operation of the bridge. This results in a load of only 30 kilohms, for example, on the subscriber's line, so that there is no need for special measures such as the series connection of inductors.

The voltage taken off at the junctions between resistors 26 and 27 and between resistors 29 and 30 is supplied across two resistors 33 and 34 and via a low-pass filter comprising a capacitor 35 to an operational amplifier 32 functioning as a discriminator. Two oppositely poled diodes 36 are preferably connected in parallel to capacitor 35 in order to protect operational amplifier 32 from overvoltages. The low-pass filter suppresses interfering voltages which may occur if there is insufficient symmetry of the bridge circuit. In order for the low-pass filter to suppress interfering voltages caused by electrified-railroad currents having a frequency of 16⅔ Hz, the time constant $\tau$ of the RC circuit consisting of resistors 33 and 34 and capacitor 35 must be about 100 ms. This in turn means that when the subscriber's line becomes busy, an interval of several time constants $\tau$ may elapse before operational amplifier 32 responds.

In order to shorten this response time, provision is made to discharge capacitor 35 quickly just before the scanning interval. For this purpose, capacitor 35 is supplied via terminals 37 and 38 and respective diodes 39 and 40 with a voltage pulse opposite to the charging voltage of capacitor 35, this voltage pulse being generated by discharge device 21 and reaching bridge 14 over two-wire line 20.

Two terminals 41 and 42 are also provided for feeding the supply voltage for operational amplifier 32, this supply voltage reaching bridge 14 from supply device 17 over two-wire line 16.

Figure 4:
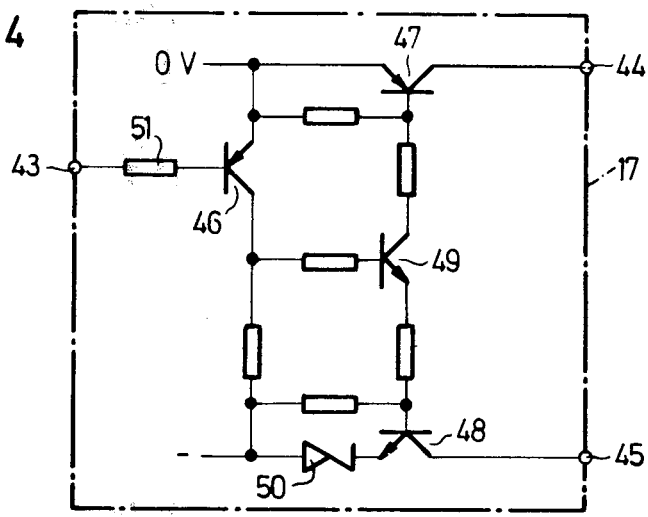
FIG. 4 is a circuit diagram of a supply device for the apparatus of FIG. 2.

FIG. 4 is a circuit diagram of supply device 17, comprising an input terminal 43, over which supply device 17 receives a control signal from control device 23, and two output terminals 44 and 45, which are connected to terminals 41 and 42 of all the bridge circuits in order economically to energize the operational amplifiers thereof only during the measuring time $t_1$ and $t_2$ (FIG. 7), i.e., for about 20 ms. Supply voltage $E_s$ is represented graphically in line a of FIG. 7.

Connected to the earlier mentioned voltage source indicated by OV and — is an electronic voltage control containing four transistors 46–49 and a Z-diode 50. When a positive voltage is supplied to the base of transistor 46 over input terminal 43 and a resistor 51, transistor 46 becomes non-conductive, causing the base of transistor 49 to be biased negative. Transistor 49 likewise becomes non-conductive, so that a positive voltage is supplied to the base of transistor 47 and a negative voltage to the base of transistor 48. Consequently, transistors 47 and 48 both become non-conductive as well, and the supply voltage $E_s$ at output terminals 44 and 45 is zero. If a negative signal reaches input terminal 43 for about 20 ms, transistors 46–49 all become conductive, causing supply voltage $E_s$ to appear at output terminals 44 and 45 for a corresponding period of 20 ms; see line a of FIG. 7.

Figure 5:
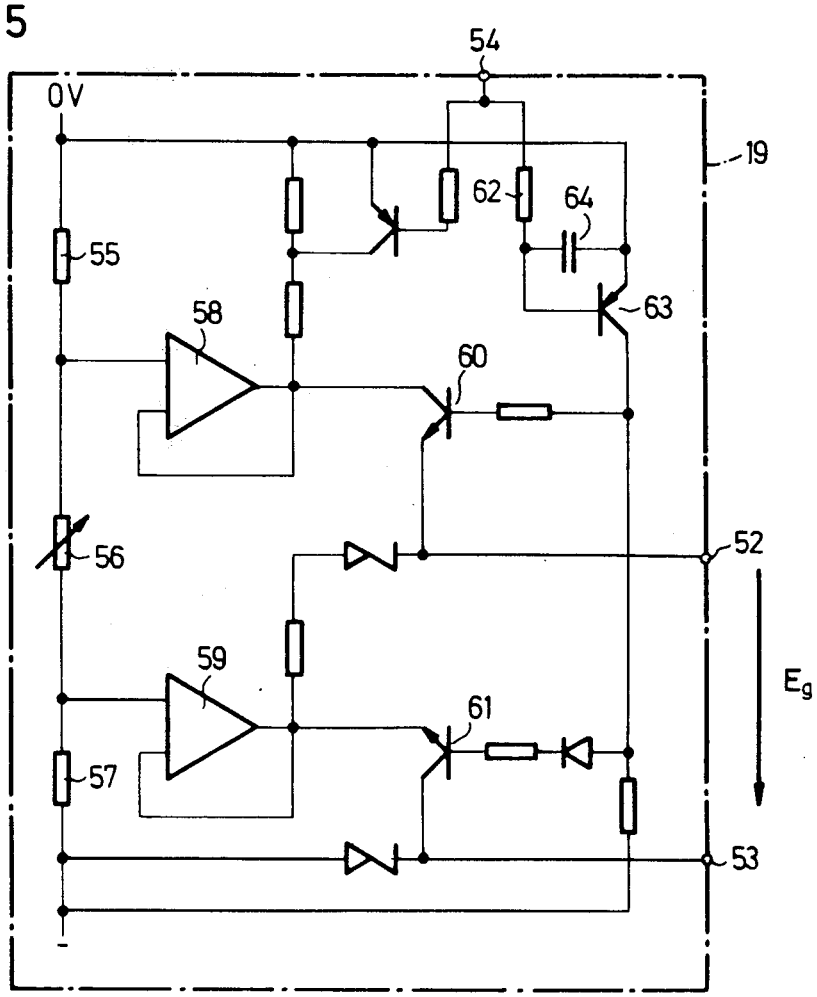
FIG. 5 is a circuit diagram of a device for generating a countervoltage for the apparatus of FIG. 2.

FIG. 5 is a circuit diagram of device 19 for generating countervoltage $E_g$. The latter appears at output terminals 52 and 53 when a negative signal from control device 23 is supplied to an input terminal 54. Countervoltage $E_g$ is generated using the voltage from source OV and — with the aid of a voltage divider containing three resistors 55, 56, and 57 and two operational amplifiers 58 and 59. The output of operational amplifier 58 is connected to output terminal 52 via the collector-to-emitter path of a switching transistor 60, and the output of operational amplifier 59 is connected to output terminal 53 via the emitter-to-collector path of a switching transistor 61. The negative signal applied to input terminal 54 is supplied across a resistor 62 to the base of a transistor 63. In this case, transistor 63 is conductive, and a positive voltage is likewise supplied to the bases of switching transistors 60 and 61, so that the latter are conductive, whereby countervoltage $E_g$ is available at output terminals 52 and 53. If the signal applied to input terminal 54 is positive, transistors 63, 60, and 61 are non-conductive, and no voltage is any longer available at output terminals 52 and 53. In order to keep clicks from being produced on the already busy subscribers' lines when countervoltage $E_g$ is switched on and off bridge 14, this countervoltage is connected and disconnected "softly," as illustrated in line b of FIG. 7. In order that countervoltage $E_g$ may exhibit this desired shape, a capacitor 64 is connected to the base and emitter of transistor 63. As a result, transistor 63 does not become conductive suddenly but gradually, nor does it revert suddenly to the non-conductive state. The leading and trailing edges of countervoltage $E_g$ are thereby flattened and rounded, so that no clicks at all are audible on the busy subscribers' lines.

Figure 6:
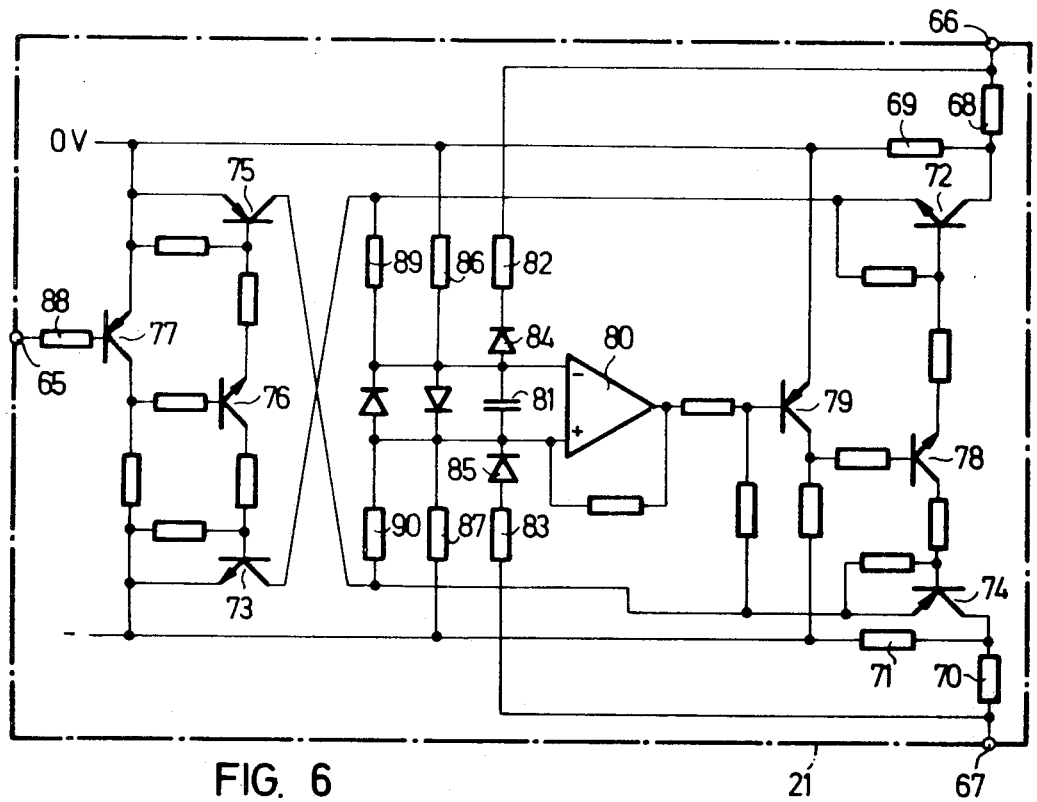
FIG. 6 is a circuit diagram of a discharge device of the apparatus of FIG. 2.

FIG. 6 is a circuit diagram of discharge device 21, which comprises an input terminal 65 and two output terminals 66 and 67. Output terminal 66 is connected to voltage source terminal OV via a series connection of two resistors 68 and 69, while output terminal 67 is connected to terminal—via a series connection of two resistors 70 and 71. The junction between resistors 68 and 69 is connected to terminal—via the collector-to-emitter paths of a transistor 72 and a transistor 73, and the junction between resistors 70 and 71 is connected to terminal OV of the voltage source via the collector-to-emitter paths of a transistor 74 and a transistor 75. When, for the reasons to be described below, transistors 72–75 are conductive, the polarity of the voltage measured between output terminals 66 and 67 is reversed, i.e., output terminal 66 carries a negative potential when the transistors are conductive and output terminal 67 a positive potential. The discharge voltage $E_e$ is supplied over two-wire line 20 to input terminals 37 and 38 of bridge 14.

Transistors 73 and 75 are controlled by two transistors 76 and 77 as a function of the signal supplied to input terminal 65. As long as this signal is positive, transistors 73 and 75 are non-conductive. Transistors 72 and 74 are controlled by two transistors 78 and 79 as a function of the output voltage of an operational amplifier 80. A capacitor 81 is connected in parallel to the two inputs of operational amplifier 80. The terminals of capacitor 81 are respectively connected to output terminals 66 and 67 of discharge device 21 via low impedance resistors 82 and 83 and diodes 84 and 85, respectively. In the rest state, i.e., when a positive signal is applied to input terminal 65 and transistors 73 and 75 are thus non-conductive, capacitor 81 is charged across resistors 86 and 87, the terminal of capacitor 81 connected to the non-inverting input of amplifier 80 being negative with respect to the terminal connected to the inverting input of that amplifier. Operational amplifier 80 transmits a negative signal at its output, so that transistor 79 is conductive. Thus, transistors 72 and 74 are also conductive. However, conductive transistors 72 and 74 have no influence upon the output voltage of discharge device 21 because transistors 73 and 75 are non-conductive.

Now if a short, negative signal arrives at input terminal 65 from control device 23, this signal reaches the base of transistor 77 across a resistor 88, and transistors 73 and 75 consequently become conductive. At that moment, the polarity of the output voltage at output terminals 66 and 67 is reversed since transistors 72 and 74 were already conductive. Discharge device 21 now delivers a discharge current $I_e$ for discharging the capacitors 35 of all the bridge circuits. Discharge current $I_e$ is illustrated in line c of FIG. 7. Capacitor 81 is also discharged via low impedance resistors 82 and 83 and diodes 84 and 85. As soon as capacitor 81 is completely discharged at time $t_3$, operational amplifier 80 generates a positive output signal, which makes transistor 79, and thus transistors 72 and 74 as well, non-conductive. Discharge current $I_e$ is interrupted because the polarity of the output voltage at output terminals 66 and 67 is reversed back to the original polarity. When capacitor 81 is discharged, the capacitors 35 of the bridge circuits are also discharged because capacitor 81 is connected in parallel to capacitors 35 across low impedance resistors 82 and 83, and the voltage between output terminals 66 and 67 is actually zero at that time.

Figure 7:
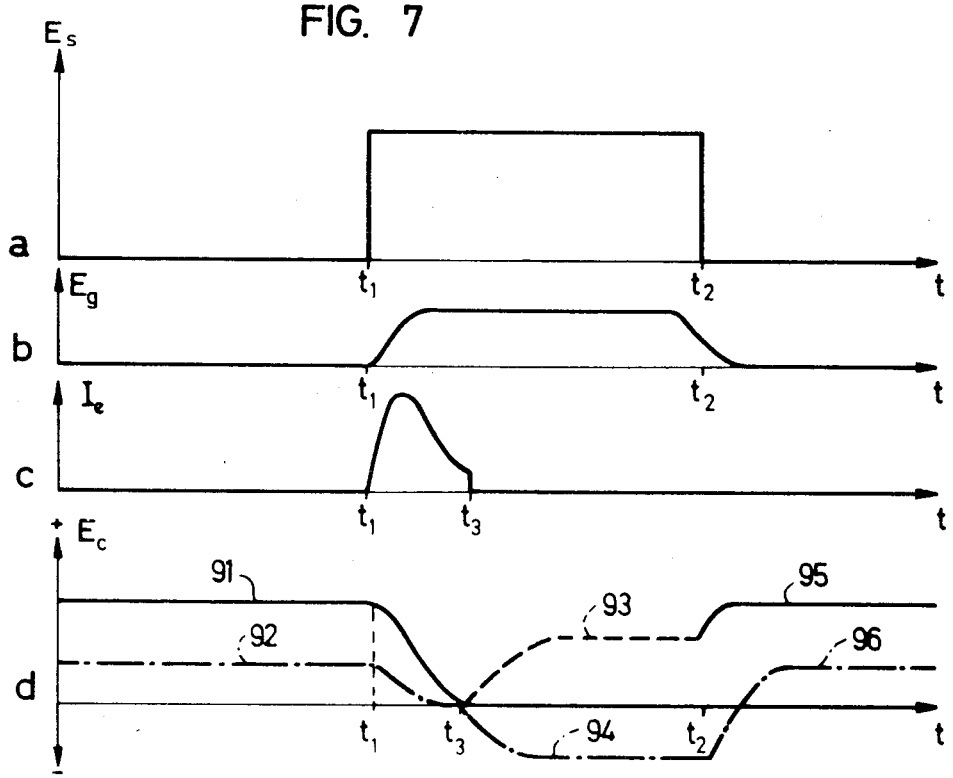
FIG. 7 is a graph of several signals of the apparatus of FIG. 2.

The gradient of the potential $E_c$ at capacitors 35 of the bridge circuits is illustrated in line d of FIG. 7. The negative signal at input terminal 65 lasts longer that the interval between $t_1$ and $t_2$. In order to prevent capacitor 81 from being recharged before the signal at input terminal 65 has become positive again, resistors 89 and 90 are provided. Not until the signal at input terminal 65 becomes positive again do transistors 73 and 75 become non-conductive, and is capacitor 81 recharged to the original voltage across resistors 86 and 87, operational amplifier 80 then transmitting a negative output signal again, which causes transistors 72 and 74 to become conductive. Upon the appearance of another negative signal at input terminal 65, the operation described above recommences.

A description having been given of the generation of the supply voltage, countervoltage, and discharge voltage necessary for operating bridge circuit 14, the function of this bridge will now be described in detail with reference to part d of FIG. 7. The condition of the subscribers' lines, i.e., whether they are busy or free, is not monitored continuously but periodically, e.g., every 500 ms, for 20 ms. This periodic monitoring is commanded by timing pulse generator 22 and control device 23. Monitoring may also be controlled by a microprocessor of the line concentrator rather than by timing pulse generator 22. All subscribers' lines are monitored simultaneously, so that supply device 17, device 19 for generating the countervoltage, and discharge device 21 supply the corresponding voltages for all of the bridge circuits.

Between two measuring intervals, capacitors 35 of all the bridge circuits are charged with a voltage dependent upon the free or busy condition of the associated subscribers' lines. The potential $E_c$ at which those capacitors 35 are charged that are associated with free lines is represented by curve 91 in line d of FIG. 7, while the potential $E_c$ at which those capacitors 35 are charged that are associated with busy lines is represented by curve 92.

When monitoring of the subscribers' lines commences at time $t_1$, the supply voltage is applied to operational amplifiers 32 of the bridge circuits by supply device 17 no later than at that moment, and preferably a few ms earlier. Also at time $t_1$, countervoltage $E_g$ is fed to the bridges by device 19, and the discharge operation of capacitors 35 of the bridges, as well as of capacitor 81 of discharge device 21, commences. At time $t_3$, capacitors 35 of all the bridge circuits and capacitor 81 are completely discharged. Thereafter, those capacitors 35 which are associated with free subscribers' lines are recharged; see curve 93. Those capacitors 35 which are associated with busy lines are likewise charged, but under the effect of countervoltage $E_g$, the charging voltage is opposite to the voltage of the free-line capacitors 35; see curve 94.

Shortly before time $t_2$, the output signals of operational amplifiers 32 of the bridges are introduced into memory 15, so that the information stored therein corresponds to the busy or free conditions of the subscribers' lines. By means not shown, the information from memory 15 is serially read out and evaluated in the microprocessor of the line concentrator. At time $t_2$, the monitoring operation is ended, having lasted a total of 20 ms. Supply voltage $E_s$ and countervoltage $E_g$ are switched off again, and capacitors 35 are recharged to the original potential they exhibited prior to the measuring interval; see curves 95 and 96.

With the apparatus described above, subscribers' lines can be monitored reliably; and owing to the introduction of countervoltage $E_g$, capacitors 24 and 25, connected between the A- and B-wires of the subscriber's line, can have substantially higher values than in prior art apparatus, whereby there is practically no additional load on the subscriber's line. Because of the low-pass filter consisting of resistors 33 and 34 and capacitor 35, the apparatus is virtually immune to direct-axis components of the voltage occurring on the two wires of the telephone subscriber's line. The disadvantage of the delayed response caused by this low-pass filter is offset by discharge device 21 in that capacitors 35 of the bridge circuits are completely charged just before the actual measuring operation. The amount of energy required during the actual monitoring operation is reduced, as compared with prior art bridges, inasmuch as monitoring takes place periodically. During the time intervening between two monitoring operations, the additional energy requirement is nil.

What is claimed is:

1. An apparatus for monitoring the busy or free condition of telephone subscribers' lines carrying an exchange line voltage, said apparatus being of the type having a number of bridge circuits corresponding to the number of said lines, each of said bridge circuits being connected to one of said lines and including means for generating a signal when the associated one of said lines is busy and means for applying to said associated one of said lines a voltage compensating said exchange line voltage, the improvement comprising:

means for periodically generating a countervoltage oppositely directed to said compensating voltage, means disposed in each of said bridge circuits for applying said countervoltage thereto, and means for controlling said countervoltage generating means.

2. The apparatus of claim 1, wherein said countervoltage generating means include means for delaying the rise and fall of said countervoltage.

3. The apparatus of claim 1, wherein said means for generating a signal is a discriminator, each of said bridge circuits further including a low-pass filter connected to said discriminator, said low-pass filter comprising two resistors and a capacitor, said capacitor being connected in parallel to the input of said discriminator.

4. The apparatus of claim 3, further comprising: means for generating a discharge voltage upon commencement of said monitoring, each of said bridge circuits further including two diodes and means connected to terminals of said capacitor via said diodes for applying said discharge voltage, whereby each said capacitor of said bridge circuits is discharged.

5. The apparatus of claim 4, wherein said discharge voltage generating means includes two further diodes, a further capacitor connected in parallel via said two further diodes to each said capacitor of said bridge circuits, and means for switching off said discharge voltage when the potential at said further capacitor drops to zero.

* * * * *